June 2, 1970 KARL-ULRICH STEIN 3,516,076

MEMORY ELEMENT EMPLOYING STACKED MAGNETIC LAYERS

Filed March 29, 1967 2 Sheets-Sheet 1

INVENTOR
Karl-Ulrich Stein

BY Spiel & Spiel

ATTYS.

INVENTOR
Karl-Ulrich Stein
BY Hill, Sherman, Meroni, Gross & Simpson
ATTYS.

3,516,076

MEMORY ELEMENT EMPLOYING STACKED MAGNETIC LAYERS

Karl-Ulrich Stein, Munich, Germany, assignor to Siemens Aktiengesellschaft, Munich, Germany, a corporation of Germany

Filed Mar. 29, 1967, Ser. No. 626,733
Int. Cl. G11c *11/14*
U.S. Cl. 340—174 6 Claims

ABSTRACT OF THE DISCLOSURE

A memory element comprising at least two stack-like superposed magnetic layers, separated from one another by nonmagnetic interlayers, in which the thickness of the interlayers is so selected that the memory element exhibits an increased wallmotion field strength in comparison with a comparable element free of such interlayer.

The present invention relates to a memory element consisting of at least two stack-like magnetic layers having a preferred axis of magnetization disposed one above the other and in each case separated from one another by nonmagnetic interlayers. To increase the critical field strength for Blochline movement and, therewith the substantial elimination of Blochline displacements and with it of the "creeping" of the walls, it has been previously proposed to so prepare the stacked magnetized layers from each other by unmagnetized interlayers that, in contrast to individual layers, a magnetzied stray field coupling occurs between the superposed, magnetized wall parts extending, for example antiparallel to each other.

In accordance with more recent developments a memory element has been created in which the lower magnetized field strength limit for the coherent rotation, and the higher field strength limit for the reversible magnetization rotation lie so close to each other that a coincident controllable information storer can be realized thereby or that production tolerances for a linear controlled information store can be more easily realized than heretofore. This concept provides that the unmagnetized layers of the first-mentioned arrangement are at least partially electrically-conductive so that these interlayers can transmit a weak, indirect exchange coupling between the directions of the magnetization in the adjacent magnetic layers. This exchange coupling has the tendency to align the magnetization in adjacent magnetic layers parallel to each other. To attain the desired inhomogeneity of this indirect exchange coupling, this more recent concept proposes the use of interlayers of inhomogeneous composition, i.e. to make up these layers of various components, i.e. in the form of a compound of various metals or a mixture of one or more metals with one or more insulating materials, as well as in the form of an alloy of various elements.

Further research now indicates that when interlayers of silicon monoxide or silicon dioxide are utilized which completely oppose the prevailing view of the specialists that the adjacent magnetic layers of a memory element also in this case exhibit phenomena which originate from the exchange coupling when the interlayers consist of non-metallic or non-electric conductive material, as the case may be.

The present invention is based on the recognition, gained from the previously mentioned research, that in the last analysis only the thickness and structure of the interlayers, not their material composition, are decisive for the creation of a memory element which meets requirements with regard to substantial elimination of information destruction of the stored information.

In recognition of this fact, the invention proposes in a memory element comprising at least two stack-like superposed magnetic layers having a preferred axis of magnetization, separated from each other in each case by non-magnetic interlayers, that the thickness of the interlayers is so selected that the memory element exhibits an increased wall-motion field strength $H_c$ in relation to a comparable element which is free of an interlayer.

As previously mentioned, multi-component electrically-conductive or insulating materials thus may be used as interlayers and, possibly, mixtures thereof if only the aforementioned requirement is met in a corresponding choice of interlayer thickness. If silicon monoxide interlayers are used, the advantage in comparison with the metallic or electrically conductive interlayers would initially reside in that these memory elements exhibit an increased stability against the diffusion phenomena, which has a very favorable effect particularly on production and aging.

The invention will be explained in greater detail in connection with the drawings, in which.

Figure 1:
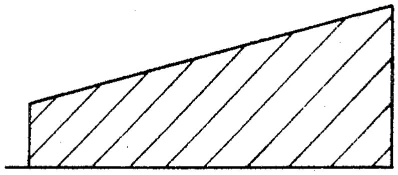
FIG. 1 is a cross section through an interlayer, illustrating merely relative proportions.
Figure 2:
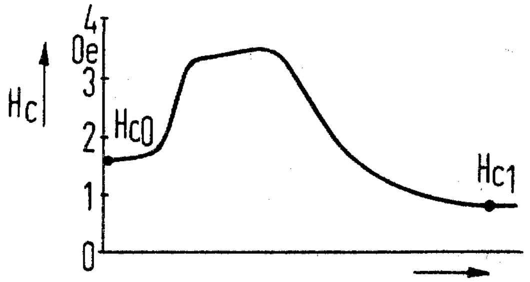
FIG. 2 is a chart illustrating the dependence of wall-motion field strength on thickness.
Figure 3:
FIG. 3 is a cross section, similar to FIG. 1, of a further example.
Figure 4:
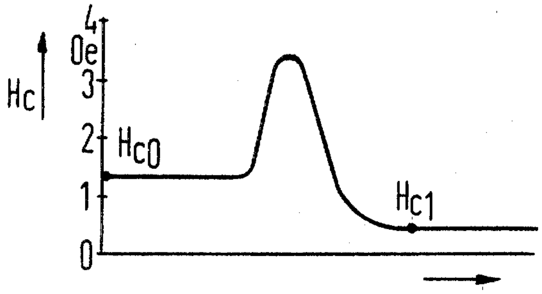
FIG. 4 is a chart, similar to that of FIG. 2, for the embodiment of FIG. 3.
Figure 5:
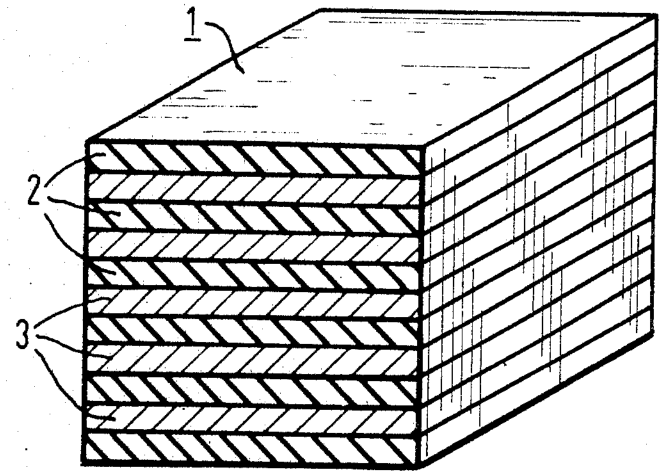
FIG. 5 is a memory element according to the present invention.

Referring to the drawings, FIGS. 1 and 3, respectively illustrate a cross section, purely in schematic representation through a tin or silicon monoxide interlayer or, with respect to FIGS. 2 and 4, when these interlayers are used, the measured dependences of the wall-motion field strengths $H_c$ (ordinates) on the thicknesses (abscissa) of such interlayers which are only relatively presented. $H_{c0}$ designates first of all, the wall-motion field strenggths of the "comparable interlayer-free" memory elements originating from the vaporizing conditions, i.e. of those elements which are produced under otherwise equivalent conditions, but without interlayers (interlayer thickness=0). On the other hand, in very thick interlayers (possibly greater than 100 A.), a lower wall-motion field strength $H_{c1}$ occurs as a result of the magnetostatic coupling between the walls existing in the magnetized layers, which strongly reduces the energy of the walls. In thinner interlayers, whose various thicknesses depend on the interlayer material utilized (in the area of a relatively few A., for example 10–30 A. for metallic interlayers, utilizing Sn, Ag, Au, Cr, Cu, Al, or about 10 to 20 A. for silicon monoxide interlayers) an increase and a maximum of the wall-motion field strength are observed. This phenomenon can perhaps be explained in that an indirect exchange coupling occurs with respect to the magnetostatic coupling which exhibits local inhomogeneities, thus rendering wall-motion difficult.

Changes may be made within the scope and spirit of the appended claims which define what is believed to be new and desired to have protected by Letters Patent.

I claim:

1. In a memory element of the type which includes a plurality of superposed magnetic layers separated from each other by non-magnetic interlayers, the improvement of extensive prevention of destruction of information stored therein to provide increased wall motion field strength in comparison with a comparable interlayer-free memory element, consisting of the provision of said interlayers as indirect exchange magnetostatic coupling members having a thickness amounting to approximately 10–20 A.

2. In a memory element in accordance with claim 1, wherein the non-magnetic interlayers comprise an oxide of silicon having a thickness amounting to approximately 10–20 A.

3. In a memory element in accordance with claim 1, wherein said non-magnetic interlayers comprise metallic material having a thickness amounting to approximately 10–30 A.

4. In a memory element in accordance with claim 1, wherein said non-magnetic interlayers comprise multicomponents selected from the group consisting of electrically conductive material, insulating material, and mixtures thereof.

5. In a memory element according to claim 4, wherein said non-magnetic interlayers comprise an oxide of silicon having a thickness amounting to approximately 10–20 A.

6. In a memory element according to claim 4, wherein said non-magnetic interlayers are metallic material having a thickness amounting to approximately 10–30 A.

References Cited

UNITED STATES PATENTS 3,375,091 3/1968 Feldtkeller ---------- 29—194

STANLEY M. URYNOWICZ, Jr., Primary Examiner

U.S. Cl. X.R.

29—194